US United States Patent [19] [11] Patent Number: 4,804,584
Nakashima et al. [45] Date of Patent: Feb. 14, 1989

[54] LAMINATES

[75] Inventors: Kunihiko Nakashima; Hiroshi Sugiura; Tatsuya Murachi; Masakazu Nakane, all of Aichi, Japan

[73] Assignee: Toyoda Gosei Co., Ltd., Nishikasugai, Japan

[21] Appl. No.: 3,990

[22] Filed: Jan. 16, 1987

[30] Foreign Application Priority Data

May 19, 1986 [JP] Japan .................. 61-113878

[51] Int. Cl.$^4$ ............................ B32B 27/00
[52] U.S. Cl. ..................... 428/424.2; 428/423.1; 428/423.5; 428/423.9; 428/424.6; 428/424.7; 428/424.8; 428/500; 428/518; 428/520; 428/522
[58] Field of Search ........... 428/423.1, 423.9, 423.5, 428/424.6, 424.7, 424.8, 424.2, 500, 520, 522, 518

[56] References Cited

U.S. PATENT DOCUMENTS 2,837,458  6/1958  Coleman, Jr. ............... 428/423.9 X
2,905,582  9/1959  Coleman, et al. ........... 428/423.9 X
3,111,450 11/1963  Stevens ...................... 428/424.6 X
3,315,380  4/1967  Mack, III et al. .......... 428/424.6 X

FOREIGN PATENT DOCUMENTS 1214748 12/1970 United Kingdom ............. 428/424.8

*Primary Examiner*—Lorraine T. Kendell
*Attorney, Agent, or Firm*—Cushman, Darby & Cushman

[57] ABSTRACT

This invention concerns a laminate in which a polyolefin polymer and a polar polymer are bonded by means of an adhesive layer, which comprises a polyolefin polymer, a polar polymer and an adhesive layer disposed between both of polymers for bonding them, in which the adhesive layer comprises: any one of adhesives selected from the group consisting of; a mixture of rubber and polyisocyanate and/or halogen compound; and a mixture of chlorinated polyolefin at 5-60% of chlorination degree, polyisocyanate and/or halogen compound coated on the side of the polyolefin polymer: and an adhesive composed of polyurethane or a mixture of polyurethane and polyisocyanate coated on the side of the polar polymer.

10 Claims, No Drawings

LAMINATES

BACKGROUND OF THE INVENTION

1. Field of the Invention

This invention concerns laminates comprising a polyolefin polymer such as a vulcanized polyolefin rubber or polyolefin synthetic resin and a polar polymer laminated by way of an adhesive layer.

2. Description of the Related Art

Among various kinds of industrial rubber products, since vulcanized polyolefin rubber such as ethylene-propylene-diene terpolymer (EPDM) and ethylene-propylene copolymer rubber (EPM) possess excellent features having outstanding performance, for example, weather proofness, aging resistance and ozone resistance and, in addition, having a wide range of workable temperature from −50° C. to 150° C., they have been employed in various fields as substrates for varius kinds of laminates or molding products. Further, depending on the application uses, there have also have used those rubbers comprising EPDM or EPM as described above blended with natural rubber (NR) or synthetic rubber, for example, styrene-butadien copolymer rubber (SBR), butadiene rubber (BR), isobutylene-isoprene copolymer rubber (IIR), chloroprene rubber (CR), acrylonitrile-butadiene copolymer rubber (NBR), isoprene rubber (IR), chlorosulfonated polyethylene (CSM) and acrylic rubber (ACM), or blended with those resins such as ABS resin, styrene resin (PS), polyethylene (PE) and polypropylene (PP) in various fields.

Further, polyolefin synthetic resins such as PP and PE as described above have also been used in a wide variety of application uses as substrates for various kinds of laminates or molding products such as those parts for use in vehicles or electronic products since they exhibit similar outstanding performance in the weather proofness, aging resistance and ozone resistance like that of the vulcanized polyolefin rubber and are available at a reduced cost.

However, since the vulcanized polyolefin rubber such as EPDM and EPM or polyolefin synthetic resin such as PP or PE as described above have no polar groups in the principal chain of the molecules, they are poor in the reactivity as compared with polar polymers, i.e., synthetic rubbers such as NR, SBR, BR, IIR, CR, NBR, IR, CSM and ACM, or synthetic resins such as ABS resin, PS, vinyl chloride resin (PVC) and nylon resin as described above.

Accordingly, there have been problems in the case of manufacturing laminates by the injection molding of the polar polymer while using, for example, a molding product comprising a polyolefin polymer as an insert, or delamination is resulted at the joined faces by the difference in the heat shrinkage between both of the materials or the migration of plasticizers blended in the polymer. Further, even if a paint or adhesive is coated for increasing the close bondability of the joined faces, there has also been a problem that the painted or coated membrane is defoliated thus leading to the delamination of the joined faces also due to the reason as described above.

This has also been pointed out to the face of laminates manufactured by other molding process.

Although there have been attempted various countermeasures for the above-mentioned problems, no satisfactory solution has not yet been found at present.

SUMMARY OF THE INVENTION

The object of this invention is to provide laminates in which the joined faces are firmly bonded over a long period of time.

In order to attain the foregoing object, the laminates according to this invention comprise a polyolefin polymer, a polar polymer and an adhesive layer disposed between both of the polymers for bonding them, in which the adhesive layer is composed of any one of adhesives selected from the group consisting of a mixture of rubber and polyisocyanate and/or halogen compound and a mixture of chlorinated polyolefin of 5–60% chlorination degree, and polyisocyanate and/or halogen compound coated on the side of the polyolefin polymer and adhesives composed of polyurethane or mixture of polyurethane and polyisocyanate coated on the side of the polar polymer.

Other objects of this invention will become apparent by understanding the embodiments to be described later and they are shown in the appended claims. Then, various advantages not mentioned in the specification will be recalled to those skilled in the art by practicing this invention.

DETAILED DESCRIPTION OF THE PREFERRED EMBODIMENTS

Prior to the explanation of examples, description will be made to each of laminates according to this invention comprising a polyolefin polymer, a polar polymer and an adhesive layer.

The polyolefin polymer is a vulcanized polyolefin rubber such as EPDM and EPM or a synthetic polyolefin resin such as PP and PE as described above.

Further, the polyolefin polymer also includes those vulcanized rubbers comprising EPDM or EPM blended with natural rubber or various kinds of synthetic rubbers, or synthetic resins such as ABS resin, PS, PE and PP depending on the application uses.

While on the other hand, the polar polymer includes various kinds of rubbers containing polar groups in the molecules such as CR, NBR and ACM, or various kinds of synthetic resins containing polar groups in the molecules such as ABS resin, PS, PVC and nylon resin.

Further, the adhesive layer is composed of adhesives coated on the side of the polyolefin polymer and adhesives coated on the side of the polar polymer.

The adhesives coated on the side of the polyolefin polymer are:

(a) a mixture of rubber, polyisocyanate and/or halogen compound, or (b) a mixture of chlorinated polyolefin at 5–60% of chlorination degree, polyisocynate and/or halogen compound.

The adhesives coated on the side of the polar polymer are:

(c) polyurethane or a mixture of polyurethane and polyisocyanate.

The laminates according to this invention are molding products in which the polyolefin polymer, the adhesive layer and the polar polymer of the above-mentioned composition are laminated to each other and they are provided with desired shapes by means of various types of molding processes such as extrusion molding, injection molding, press molding and vacuum molding.

The composition for each of the adhesives will now be described specifically.

(a) The mixture of rubber, polyisocyanate and/or halogen compound is any one of:
- a-1: a mixture of rubber and polyisocyanate,
- a-2: a mixture of rubber and halogen compound, and
- a-3: a mixture of rubber, polyisocyanate and halogen compound.

Any of these mixtures is a composition mainly comprising rubber and blended with highly polar polyisocyanate and/or halogen compound, which exhibits strong bonding force to various types of polyolefin polymers due to the polarity of the polyisocyanate and/or halogen compound.

Examples of the rubber as described above can include natural rubber and various kinds of synthetic rubbers such as NR, SBR, BR, IIR, CR, NBR, IR, ACM, EPDM and EPM.

Further, these rubbers are blended with those additives usually blended, i.e., (1) sulfur, morpholine disulfide or dicumylperoxide as a vulcanizer, (2) 2-mercaptobenzothiazole, zinc dimethyl dithiocarbamate or tetramethylthiuram disulfide as a vulcanization accelelator, (3) 2,6-di-tert-butyl-p-cresol or 2,6-di-tert-butyl-4-ethylphenol as an antioxidant, (4) phenyl-α-naphthylamine or N,N'-diphenyl-p-phenylene diamine as an antiaging agent, (5) carbon black, calcium carbonate, clay or hydrous silicate as a filler and (6) dioctyl sebacate and mineral oils as a plasticizer.

The polyisocyanate described above is a polymer prepared by polymerizing diisocyanate such as 2,4-tolylene diisocyanate, hydrogenated 2,4-tolylene diisocyanate, 4,4'-diphenylmethane diisocyanate, hydrogenated 4,4'-diphenylmethane diisocyanate, 1,5-naphthalene diisocyanate, xylene diisocyanate, hydrogenated xylene diisocyanate, 1,6-hexamethylene diisocyanate and isophorone diisocyanate, or polyfunctional isocyanate such as 4,4',4"-triphenyl methane triisocyanate, and tris-(p-isocyanatephenyl)-thiophosphate.

Typical examples of the halogenating agent as described above are compound containing:

bond (where X represents halogen) in the molecule, alkyl hypohalide or hypochlorite and, in addition, various kinds of halogen compounds such as chlorine, bromine or aqueous solution thereof; a mixture comprising hypochlorite and organic acid; antimony pentafluoride; aqueous solution of alkali metal or alkaline earth metal, mixed solution containing sulfur fluoride and bromine; mixture of iodine and potassium iodide; a mixed aqueous solution comprising oxygen halide and concentrated hydrochloric acid; and mixed aqueous solution comprising alkali bromide and peroxodisulfuric acid.

The compound containing

bond (where X represents halogen) can include specifically, for example, halogenated succinimide such as N-bromosuccinimide; isocyanuric halide such as isocyanuric dichloride and isocyanuric trichloride; and halogenated hydantoin such as dichloro dimethyl hydantoin.

Further, alkyl hypohalide includes various kinds of normal, secondary or tertiary alkyl hypohalides, the use of stable tertiary alkyl hypochloride or tertiary alkyl hypobromide being particularly preferred.

Further, the hypochlorite can include, for example, sodium hypochlorite, potassium hypochlorite or calcium hypoclorite, and these hypochlorites may be used in the form of emulsion by adding an emulsifier.

Each of these halogen compounds may be used alone or two or more of them may be used in admixture.

Then, the adhesives comprising the above-mentioned composition can be prepared by merely selecting one or more of rubber, polyisocyanate and/or halogen compound exemplified as described above and mixing them in a solvent. The blending ratio is as below:

a-1:

In the case of a mixture comprising rubber and polyisocyanate, from 0.1 to 50 parts by weight of polyisocyanate based on 100 parts by weight of rubber is appropriate. If the blending ratio of the polyisocyanate is less than 0.1 parts by weight, it does not contribute to the improvement in the close bondability. Further, if it exceeds 50 parts by weight, the workability is reduced since the curing of the adhesives is retarded.

a-2:

In the case of a mixture comprising rubber and halogen compound, from 0.002 to 20 parts by weight of the halogenating agent based on 100 parts by weight of rubber is appropriate. If the halogenating agent is less than 0.002 parts by weight, it does not contribute to the improvement in the close bondability. On the other hand, even if the blending ratio is greater than 20 parts by weight, no improvement can be expected for the close bondability.

a-3:

In the case of a mixture comprising rubber, polyisocyanate, halogen compound, it is appropriate to use from 0.1 to 50 parts by weight of polyisocyanate and from 0.002 to 20 parts by weight of halogenating agent based on 100 parts by weight of the rubber.

The solvent usable herein are those solvents selected properly from saturated hydrocarbons such as n-hexane and cyclohexane, aromatic hydrocarbons such as benzene, toluene and xylene; ethers such as dioxane and tetrahydrofuran; acetic acid esters such as ethyl acetate and propyl acetate; ketones such as acetones, cyclohexanone and methyl ethyl ketone; chlorinated hydrocarbons such as methylene chloride, trichloroethylene and 1,1,1-trichloroethane and dimethyl sulfoxide or dimethylformamide either alone or as a mixed solvent comprising two or more of them. Other organic solvents may also be used so long as they do not react with halogenating agent or isocyanate. The solid concentration of each of the mixture in the organic solvent is preferably less than 35%, since solid components may possibly be deposited if the concentration exceeds 35%.

The close bondability of the adhesives can further be increased by blending less than 50 parts by weight of a polymer prepared by polymerizing a low molecular polyol such as pentaerythritol, trimethylol propane and glycerine, and diisocynate or polyfunctional isocyanate based on 100 parts by weight of the rubber in each of the mixtures a:1-3.

(b) The mixture of chlorinated polyolefin at 5-60% of chlorination degree, polyisocyanate and/or halogenated compound is any one of:
  b-1: a mixture of chlorinated polyolefin at 5-60% chlorination degree and polyisocyanate, b-2: a mixture of chlorinated polyolefin at 5-60% chlorination degree and halogen compound.

b-3: a mixture of chlorinated polyolefin at 5-60% chlorinated degree, polyisocyanate and halogen compound.

Any of these mixtures is a composition mainly composed of chlorinated polyolefin having a high bondability to the polyolefin polymer and blended with highly polar polyisocyanate and/or halogen compound, and exhibits strong bondability to each kind of the polyolefin polymers in the same manner as each of the mixtures a:1-3 described above.

While chlorinated polyethylene, chlorinated polypropylene, chlorinated EPDM and chlorinated EPM can be exemplified as the chlorinated polyolefin, use of a chlorinated polypropylene at 5-60% chlorination degree or chlorinated polyethylene at 5-60% chlorination degree is particularly preferred in view of the polarity and the compatibility with polyisocyanate.

Further, the polyisocyanate or halogen compound consists of one or more of those selected from the various polyisocyanates or halogen compounds respectively as exemplified above and, adhesives can be obtained by mixing them together with the chlorinated polyolefin into each of the above-exemplified solvents. The blending ratio is as below:

b-1:

In the case of a mixture of chlorinated polyolefin at 5-60% chlorination degree and polyisocyante, from 0.1 to 50 parts by weight of polyisocyanate based on 100 parts by weight of chlorinated polyolefin is appropriate. If the blending ratio of the polyisocyanate is less than 0.1 parts by weight, it does not contribute to the improvement in the close bondability. On the other hand, if it exceeds 50 parts by weight, the workability is reduced since the curing of the adhesives is retarded.

b-2:

In the case of a mixture of chlorinated polyolefin at 5-60% chlorination degree and halogen compound, from 0.002 to 40 parts by weight of the halogenating agent based on 100 parts by weight of chlorinated polyolefin is appropriate. If the blending ratio of the halogenating agent is less than 0.002 parts by weight, it does not contribute to the improvement in the close bondability. On the other hand, even if it exceeds 40 parts by weight, no improvement can be expected for the close bondability.

b-3:

In the case of a mixture of chlorinated polyolefin at 5-60% chlorination degree, polyisocyanate and halogen compound, 0.1-50 parts by weight of the polyisocyanate and 0.002-40 parts by weight of the halogenating agent each based on 100 parts by weight of the chlorinated polyolefin are appropriate.

The solid concentration of each of the mixtures in the organic solvent is preferably less than 35% like the case of the adhesives comprising the rubber, polyisocyanate and/or halogen compound. If it exceeds 35%, solid content may possibly be deposited.

The close bondability of the adhesives can further be improved as required by blending less than 50 parts by weight of a polymer prepared by polymerizing a low molecular polyol such as pentaerythritol, trimethylol propane and glycerine with the diisocyanate or polyfunctional isocyanate as described above based on 100 parts by weight of the chlorinated polyolefin described above in each of the mixtures described in b-1-3 above.

(c) Polyurethane, or mixture of polyurethane and polyisocyanate.

Polyurethane is a 2-liquid component curing type polyurethane having NCO groups or OH groups in the terminal end of the molecule obtained by polymerizing an isocyanate and a polyester polyol (or polyether polyol) with an excess isocyanate molar ratio and by further conducting polymerizing reaction with an addition of a chain extender.

The isocyanate described above usable herein are various kinds of diisocyanates and polyfunctional isocyanates exemplified as above.

The polyol component in the polyester polyols described above can include, for example, ethylene glycol, 1,2-propylene glycol, 1,4-butanediol, 1,3-butanediol, 2,3-butanediol, 1,5-pentanediol, 1,6-pentanediol, 1,6-hexanediol, neopentyl glycol, diethylene glycol, dipropylene glycol, triethyleneglycol, pentaerythritol and trimethylol propane.

The organic acid component can include, for example, dicarboxylic acids such as succinic acid, phthalic acid, phthalic acid anhydride, isophthalic acid, maleic acid, adipic acid, azelaic acid and sebacic acid.

While on the other hand, the polyether polyol can include, for example, polyoxypropylenediol, polytetramethylene glycol ether and polyoxyethylenediol.

The chain extender usable herein can include those exemplified for the polyol ingredient for the polyester polyol described above.

While various polyols other than those exemplified above such as chloroprene rubber or acrylic resin can be used as the polyol, since the close bondability is liable to be reduced if plasticizers contained in the polar polymer migrate to the joined faces, the use of polyester polyol less undergoing the effect of the plasticizers is preferred.

The adhesives comprising the polyurethane of the above-mentioned composition have such a composition that exhibits strong close bondability to various types of the polar polymers, more strong close bondability can be shown by mixing polyisocyanate.

The polyisocyanate is a polymer prepared by polymerizing various types of diisocyanates or polyfunctional isocyanates as exemplified above and it may be mixed at a ratio of less than 50 parts by weight based on 100 parts by weight of the polyurethane described above. Even if it exceeds 50 parts by weight, no improvement can be expected for the close bondability and the workability is reduced since the curing of the adhesives is retarded.

The adhesive layer in this invention is obtained by coating a mixture of:

(a) rubber, polyisocyanate and/or halogen compound, or (b) chlorinated polyolefin at 5-60% chlorination degree, polyisocyanate and/or halogen compound mixed in an organic solvent to the joined face on the side of the polyolefin polymer, and by coating, (c) polyurethane diluted with an organic solvent or a mixture of polyurethane and polyisocyanate in an organic solvent to the joined faces on the side of the polar polymer, firmly bonding both of the joined faces and then drying them under heating.

Alternatively, the adhesives (c) may be coated to the surface of the adhesives (a) or (b) coated to the joined face on the side of the polyolefin polymer and, then, the polar polymer may be laminated thereover. Conversely, adhesives (a) or (b) may be coated to the surface of the adhesives (c) after being coated to the joined face on the side of the polar polymer and then the polyolefin polymer may be laminated thereover.

When the organic solvent is evaporated due to heating, the adhesives (a)-(c) are formed into a hard adhesives layer, in which the heat is utilized from the heat usually upon molding the laminates. Further, in the case of the adhesives (a) containing unvulcanized rubber, vulcanizing reaction of rubber proceeds simultaneously to obtain a hard adhesive layer.

The laminates according to this invention comprise the polyolefin polymer, the polar polymer and the adhesive layer formed by the coating between both of the polymers. The laminates are not restricted only to those comprising the polyolefin polymer, polar polymer and adhesive layer each by one layer, but a plurality layers of the polyolefin polymer and the polar polymer may be laminated alternately and the adhesives layer may be coated to form to each of the joined faces.

EXAMPLE-1

(1) Adhesives for polyolefin polymer
A blend with the composition as shown in Table-1 is kneaded to prepare unvulcanized rubber-1.

TABLE 1

(parts mean parts by weight in the table here and hereinafter)

| | |
|---|---|
| SBR | 100 parts |
| carbon black | 35 parts |
| Zinc oxide | 5 parts |
| Stearic acid | 1 part |
| Sulfur | 4.6 parts |

In the same manner, blends of the compositions shown in the following Tables 2-4 were mixed to prepare unvulcanized rubbers 2-4.

TABLE 2

(unvulcanized rubber-2)

| | |
|---|---|
| SBR | 100 parts |
| carbon black | 35 parts |
| Zinc oxide | 5 parts |
| Stearic acid | 1 part |
| Sulfur | 7 parts |

TABLE 3

(unvulcanized rubber-3)

| | |
|---|---|
| EPDM | 100 parts |
| carbon black | 40 parts |
| Zinc oxide | 5 parts |
| Stearic acid | 1 part |
| Sulfur | 5.35 parts |

TABLE 4

(unvulcanized rubber-4)

| | |
|---|---|
| EPDM | 100 parts |
| carbon black | 40 parts |
| Zinc oxide | 5 parts |
| Stearic acid | 1 part |
| Sulfur | 8.7 parts |

Then, the unvulcanized rubber, polyisocyanate and-/or halogen compound were mixed in a mixed solvent of 1,1,1-trichloroethane/dimethyl formamide=100/60 to obtain adhesives for polyolefin polymer. The blending ratio of unvulcanized rubber, polyisocyanate and/or halogen compound are shown in Tables 5, 6.

TABLE 5

| Laminate | Adhesive for polyolefin polymer | | | Adhesive for polar polymer | | Delamination |
|---|---|---|---|---|---|---|
| | Unvulcanized rubber | Halogenating agent | Polyisocyanate | Polyurethane | Polyisocyanate | |
| 1 | 1 100 parts | / | / | / | / | o |
| 2 | / | / | / | 2 100 parts | / | o |
| 3 | 1 100 parts | t-BHC 0.4 parts | / | / | / | x |
| 4 | 1 100 parts | TCIA 0.001 parts | / | 3 100 parts | / | x |
| 5 | 1 100 parts | TCIA 0.002 parts | / | 1 100 parts | / | o |
| 6 | 1 100 parts | TCIA 0.05 parts | / | 4 100 parts | / | o |
| 7 | 1 100 parts | TCIA 20 parts | / | 5 100 parts | / | o |
| 8 | 1 100 parts | TCIA 30 parts | / | 6 100 parts | / | x |
| 9 | 1 100 parts | TCIA 0.05 parts | MDI 20 parts | 7 100 parts | / | o |
| 10 | 1 100 parts | TCIA 0.05 parts | TDI 50 parts | 5 100 parts | / | o |
| 11 | 1 100 parts | TCIA 0.05 parts | TPMI 60 parts | 5 100 parts | / | x |
| 12 | 1 100 parts | TCIA 0.05 parts | XDI 20 parts | 5 100 parts | XDI 20 parts | o |
| 13 | 1 100 parts | TCIA 0.05 parts | NDI 20 parts | 5 100 parts | NDI 50 parts | o |
| 14 | 1 100 parts | TCIA 0.05 parts | hydrogenated MDI 20 parts | 5 100 parts | hydrogenated MDI 60 parts | x |
| 15 | 1 100 parts | t-BHC 0.05 parts | / | 5 100 parts | / | o |
| 16 | 1 100 parts | NBSI 0.05 parts | / | 5 100 parts | / | o |
| 17 | 2 100 parts | TCIA 0.05 parts | TPMI 10 parts | 2 100 parts | TPMI 10 parts | o |
| 18 | 2 100 parts | TCIA 0.05 parts | TPMI 20 parts | 5 100 parts | / | o |
| 19 | 3 100 parts | TCIA 0.05 parts | TPMI 20 parts | 2 100 parts | / | o |
| 20 | 4 100 parts | TCIA 0.05 parts | TPMI 10 parts | 2 100 parts | TPMI 10 parts | o |

Halogenating agent:
t-BHC = tertiary butyl hypochloride
TCIA = trichloroisocyanuric acid
NBSI = N-brome succinimide
Polyisocyanate:
MDI = 4,4'-diphenylmethane diisocyanate,
TDI = tolylene diisocyanate
TPMI = 4,4',4''-triphenylmethane triisocyanate
NDI = 1,5-naphthalene diisocyanate

TABLE 6

| Laminate | Adhesive for polyolefin polymer | | | Adhesive for polar polymer | | Delamination |
|---|---|---|---|---|---|---|
| | Unvulcanized rubber | Halogenating agent | Polyisocyanate | Polyurethane | Polyisocyanate | |
| 21 | 4 100 parts | TCIA 0.05 parts | TPMI 20 parts | 2 100 parts | / | O |
| 22 | 3 100 parts | TCIA 0.05 parts | TPMI 10 parts | 2 100 parts | TPMI 10 parts | O |
| 23 | 1 100 parts | / | / | / | / | x |
| 24 | 1 100 parts | / | MDI 10 parts | / | / | x |
| 25 | 1 100 parts | / | TDI 10 parts | 1 100 parts | / | O |
| 26 | 1 100 parts | / | XDI 0.05 parts | 1 100 parts | / | x |
| 27 | 1 100 parts | / | hydrogenated MDI 0.1 parts | 2 100 parts | / | O |
| 28 | 1 100 parts | / | TPMI 10 parts | 2 100 parts | / | O |
| 29 | 1 100 parts | / | TPMI 50 parts | 3 100 parts | / | O |
| 30 | 1 100 parts | / | MDI 60 parts | 3 100 parts | / | x |
| 31 | 2 100 parts | / | TPMI 10 parts | 4 100 parts | / | O |
| 32 | 2 100 parts | / | TPMI 20 parts | 4 100 parts | / | O |
| 33 | 3 100 parts | / | TPMI 10 parts | 5 100 parts | / | O |
| 34 | 4 100 parts | / | TPMI 20 parts | 5 100 parts | / | O |
| 35 | 1 100 parts | / | TPMI 10 parts | 6 100 parts | XDI 10 parts | O |
| 36 | 1 100 parts | / | TPMI 10 parts | 6 100 parts | NDI 50 parts | O |
| 37 | 1 100 parts | / | TPMI 10 parts | 7 100 parts | hydrogenated MDI 60 parts | x |
| 38 | 2 100 parts | / | TPMI 10 parts | 7 100 parts | TDI 10 parts | O |
| 39 | 3 100 parts | / | TPMI 10 parts | 1 100 parts | TPMI 10 parts | O |
| 40 | 4 100 parts | / | TPMI 10 parts | 2 100 parts | TPMI 10 parts | O |

(2) Adhesives for polar polymer

Polyester polyol (or polyether polyol) and isocyanate are dissolved into a mixed solvent of 1,1,1-trichloroethane/dimethyl formamide=100/60 so as to contain 35% solid content and, after reaction at 80° C. for three hours in a dry nitrogen gas, they were further reacted at 80° C. for three hours with the addition of a chain extender to prepare polyurethanes 1-7 respectively.

The compositions and the blending ratio (converted to weight ratio) of the polyester polyol or (polyether polyol), isocyanate and the chain extender used herein are shown below.

| Polyurethane-1: | |
|---|---|
| Polypropylene glycol (molecular weight = 2000) | 164.0 parts |
| 4,4'-diphenylmethane diisocyanate | 100.0 parts |
| 1,6-hexanediol | 24.8 parts |
| Polyurethane-2: | |
| Polyethylene adipate (molecular weight = 2000) | 164.0 parts |
| Tolylene diisocyanate | 69.6 parts |
| 1,4-butanediol | 18.9 parts |
| Polyurethane-3: | |
| Polybutylene adipate (molecular weight = 2000) | 200.0 parts |
| xylene diisocyanate | 56.5 parts |
| ethylene glycol | 11.8 parts |
| Polyurethane-4: | |
| Polyethylene adipate (molecular weight = 2000) | 200.0 parts |
| polypropylene glycol (molecular weight = 1000) | 100.0 parts |
| 4,4'-diphenylmethane diisocyanate | 250.0 parts |
| 1,6-hexanediol | 89.8 parts |
| Polyurethane-5: | |
| Polyethylene adipate (molecular weight = 2000) | 200.0 parts |
| 4,4'-diphenylmethane diisocyanate | 100.0 parts |
| 1,6-hexanediol | 37.8 parts |
| Polyurethane-6: | |
| Polybutylene adipate (molecular weight = 1000) | 100.0 parts |
| hydrogenated 4,4'-diphenylmethane diisocyanate | 104.9 parts |
| 1,5-pentanediol | 32.3 parts |
| Polyurethane-7: | |

-continued

| | |
|---|---|
| Polybutylene adipate (molecular weight = 1000) | 100.0 parts |
| Polypropylene glycol (molecular weight = 2000) | 400.0 parts |
| 4,4'-diphenylmethane diisocyanate | 450.0 parts |
| 1,6-hexanediol | 180.8 parts |

The adhesives for the polar polymer are any one of the polyurethanes 1-7 as described above or the blend of any one of the polyurethanes 1-7 with polyisocyanate, and their blending ratio are shown in Tables-5 and 6.

(3) Laminated products:

Polypropylene resin was injection molded into a plate of 40 mm width, 150 mm length and 10 mm thickness which was bent at the middle portion substantially into an L-shaped configuration. The plate was bent such that the bent portion at the central portion thereof has a radius: R=20 mm. Then, adhesives for polyolefin polymer shown respectively in Tables 5 and 6 were coated on the surface of the plate made of polypropylene resin, hot blow was blown to the surface at 80° C. for 10 sec. and, then, adhesives for polar polymer as shown in Tables 5 and 6 were coated further thereover.

Then, vinyl chloride resin of the composition shown in the following Table-7 was injection molded at 200° C. while using the plate made of polypropylene resin to prepare a laminate. In this case, vulcanizing reduction for the unvulcanized rubber in the adhesives for polyolefin polymer was proceeded simultaneously.

TABLE 7

| | |
|---|---|
| Vinyl chloride resin (polymerized degree - 1900) | 100 parts |
| Epoxidized soybean oil | 3 parts |
| Dioctylphthalate | 120 parts |
| Di-n-octyl tin laurate | 4.5 parts |

After preparing each of the laminates comprising the polypropylene resin, adhesive layer, and vinyl chloride resin as described above and leaving them at a room temperature for 7 days and, further, in a thermostable vessel at 80° C. for one hour, it was measured as to whether delamination was resulted between the polypropylene resin and the vinyl chloride resin at the bent portion in each of the laminates respectively. The results are shown in Tables 5 and 6 together with the combination of the adhesives for polyolefin polymer and the adhesives for use in the polar polymer employed. Each of the laminates showed preferable close bondability excepting the case of laminates 1-4, 8, 11, 14, 23, 24, 26, 30 and 37 where the composition of the adhesives were not adequate.

Since the adhesive layers of laminates 1 and 23 were composed only of SBR rubber, since the adhesive layer for the laminate 2 lacked in the adhesives for use in the polyolefin polymer, and since the adhesive layer for the laminates 3 and 24 lacked in the adhesives for the polar polymer, delamination was resulted in each of them.

Further, the blending ratio of the halogenating agent in the adhesives for polyolefin polymer is low in the adhesive layer of the laminate 4. While on the other hand, the blending ratio of the halogenating agent in the adhesives for polyolefin polymer is excessive in the adhesive layer of the laminate 8. The blending ratio of the polyisocyanate in the adhesives for polyolefin polymer is excessive in the adhesive layer of the laminates 11 and 30. The blending ratio of the polyisocyanate in the adhesives for polyolefin polymer is low in the adhesive layer of the laminate 26. The blending ratio of the polyisocyanate in the adhesives for polar polymer is excessive in the adhesive layer of the laminates 14 and 37.

Accordingly, delamination was resulted or the bonding strength was poor in any of the laminates described above. The following compositions in Comparative Examples 1-9 have usually been employed as the adhesives for polyolefin polymer.

Comparative Example-1

"Becozol J-534" (linseed oil-modified long chained alkyd resin: manufactured by Dainippon Ink Chemical Industry Co.) was diluted with mineral base and further incorporated with cobalt naphthate as a drying agent to prepare a composition.

COMPARATIVE EXAMPLE-2

A composition comprising "Esterresin-20" (saturated polyester resin: manufactured by Toyoboseki Co., Ltd.) diluted in a mixed solvent of methyl ethyl ketone/toluene=1/9 (weight ratio) was prepared.

COMPARATIVE EXAMPLE-3

A composition comprising "Vinylite-VMCH" (vinyl chloride-vinyl acetate copolymer: manufactured by Union Carbide Co.) diluted in a mixed solvent of methyl ethyl ketone/toluene=1/1 (weight ratio) was prepared.

COMPARATIVE EXAMPLE-4

A composition comprising "Eslex-BM-2" (butyral resin: manufactured by Sekisui Chemical Industry Co. Ltd.) diluted in a mixed solvent of butanol/xylene=1/1 (weight ratio) was prepared.

COMPARATIVE EXAMPLE-5

A composition comprising "Olyster-M55-80A" (moisture curing type polyurethane resin: manufactured by Mitsui Toatsu Chemical Industry Co., Ltd.) diluted in toluene was prepared.

COMPARATIVE EXAMPLE-6

A composition comprising a mixture composed of "Desmophen-100" (polyhydroxy compound: manufactured by Bayer AG) and "Desmodur-R" (polyisocyanate, manufactured by Bayer AG) at 1/1.5 (weight ratio) diluted in a mixed solvent of methylene glycol/butyl acetate/ethyl acetate/toluene=1/1/1/1 (weight ratio) was prepared.

COMPARATIVE EXAMPLE-7

A composition comprising a 4/1 mixtyure of "Becozol J-524" (linseed oil-modified long chained alkyd resin: manufactured by Dainippon Ink Chemical Industry Co., Ltd.) and "Super-Bekamin J-820" (butylated melamine resin manufactured by the above mentioned company) was prepared.

COMPARATIVE EXAMPLE-8

A composition comprising a 99/1 mixture of "Acryloid C-110V" (thermoplastic acrylic resin: manufactured by Rom & Hase Co. Ltd.) and nitrocellulose diluted in toluene was prepared.

COMPARATIVE EXAMPLE-9

A 4/1 mixture comprising "Acryldic 47-712" (thermosetting acrylic resin: manufactured by Dainippon Ink Chemical Industry Co., ltd.) and "Super-Bekamin 47-508" diluted in a mixed solvent of toluene and butyl acetate was prepared.

Then, after preparing laminates comprising polypropylene resin, adhesive layer and vinyl chloride resin by the combination of any one of adhesives as described in the Comparative Example 1-9 and adhesives for polar polymer exemplified as described above, they were left for 7 days at room temperature and further for one hour in a thermostable bath at 80° C. Then, it was measured as to whether delamination was resulted between the polypropylene resin and the vinyl chloride resin at the bent portion in each of the laminates. As a result, delamination was resulted or the close bondability was weak in any of the laminates.

EXAMPLE-2

(1) Adhesive for polyolefin polymer

Chlorinated polypropylene, polyisocyanate and/or halogen compound were mixed in a mixed solvent of 1,1,1-trichloroethane/dimethyl formamide=100/60 to obtain adhesives for polyolefin polymer. The blending ratios of chlorinated polypropylene, polyisocyanate and/or halogen compound are shown in Tables 8 and 9.

(2) Adhesives for polar polymer

Adhesives for polar polymer were polyurethanes 1-7 prepared in Example-1 or any one of these polyurethanes 1-7 blended with polyisocyanate and the blending ratios thereof are shown in Tables 8 and 9.

(3) Laminates

A polyamide resin was injection molded to prepare a plate of 40 mm width, 150 mm length and 10 mm thickness bent at the middle portion substantially into an L-shaped configuration. The bent portion at the center of the plate was bent so as to form radius R=20 mm in the same manner as the laminate in Example-1.

Then, after coating the adhesives for polar polymer shown respectively in Tables 8 and 9 to the surface of the polyamide resin plate and blowing a hot blow at 80° C. for 10 sec. to the surface thereof, adhesives for polyolefin polymer shown in Tables 8 and 9 were further coated on the surface thereof.

halogenating agent in the adhesives for polyolefin polymer was excessive in the adhesive layer of laminate 63.

TABLE 8

| Lami- | Adhesive for polyolefin polymer | | | Adhesive for polar polymer | | Delamina- |
|---|---|---|---|---|---|---|
| nates | Chlorinated polypropylene | Halogenating agent | Polyisocyanate | Polyurethane | Polyisocyanate | tion |
| 41 | (Chlorination degree = 13%) 100 parts | / | / | / | / | x |
| 42 | / | / | / | 1 100 parts | / | x |
| 43 | (Chlorination degree = 13%) 100 parts | / | TDI 10 parts | 100 parts | / | x |
| 44 | / | / | / | 1 100 parts | MDI 10 parts | x |
| 45 | (Chlorination degree = 43%) 100 parts | / | / | 1 100 parts | / | O |
| 46 | (Chlorination degree = 30%) 100 parts | / | TDI 10 parts | 2 100 parts | / | x |
| 47 | (Chlorination degree = 32%) 100 parts | / | / | 2 100 parts | / | O |
| 48 | (Chlorination degree = 34%) 100 parts | / | / | 3 100 parts | / | O |
| 49 | (Chlorination degree = 13%) 100 parts | / | / | 3 100 parts | / | O |
| 50 | (Chlorination degree = 30%) 100 parts | / | TDI 50 parts | 4 100 parts | / | O |
| 51 | (Chlorination degree = 30%) 100 parts | / | TDI 70 parts | 4 100 parts | / | x |
| 52 | (Chlorination degree = 30%) 100 parts | / | / | 5 100 parts | MDI 10 parts | O |
| 53 | (Chlorination degree = 30%) 100 parts | / | / | 5 100 parts | MDI 50 parts | O |
| 54 | (Chlorination degree = 30%) 100 parts | / | / | 6 100 parts | MDI 70 parts | x |
| 55 | (Chlorination degree = 30%) 100 parts | / | TPMI 10 parts | 6 100 parts | TPMI 10 parts | O |
| 56 | (Chlorination degree = 30%) 100 parts | / | MDI 10 parts | 7 100 parts | MDI 50 parts | O |

TABLE 9

| Lami- | Adhesive for polyolefin polymer | | | Adhesive for polar polymer | | Delamina- |
|---|---|---|---|---|---|---|
| nates | Chlorinated polypropylene | Halogenating agent | Polyisocyanate | Polyurethane | Polyisocyanate | tion |
| 57 | (Chlorination degree = 13%) 100 parts | NBSI 0.4 parts | / | / | / | x |
| 58 | / | / | / | 1 100 parts | / | x |
| 59 | (Chlorination degree = 43%) 100 parts | NBSI 0.4 parts | / | 2 100 parts | / | O |
| 60 | (Chlorination degree = 43%) 100 parts | NBSI 0.002 parts | / | 2 100 parts | / | O |
| 61 | (Chlorination degree = 43%) 100 parts | NBSI 0.0005 parts | / | 2 100 parts | / | x |
| 62 | (Chlorination degree = 43%) 100 parts | NBSI 40 parts | / | 2 100 parts | / | O |
| 63 | (Chlorination degree = 43%) 100 parts | NBSI 0.05 parts | / | 3 100 parts | / | x |
| 64 | (Chlorination degree = 30%) 100 parts | TCIA 0.05 parts | / | 4 100 parts | / | O |
| 65 | (Chlorination degree = 32%) 100 parts | TCIA 0.05 parts | / | 5 100 parts | / | O |
| 66 | (Chlorination degree = 34%) 100 parts | TCIA 0.05 parts | / | 6 100 parts | / | O |
| 67 | (Chlorination degree = 30%) 100 parts | TCIA 0.05 parts | / | 7 100 parts | / | O |
| 68 | (Chlorination degree = 30%) 100 parts | t-BHC 0.05 parts | / | 3 100 parts | / | O |
| 69 | (Chlorination degree = 30%) 100 parts | TCIA 0.05 parts | TPMI 10 parts | 3 100 parts | / | O |
| 70 | (Chlorination degree = 30%) 100 parts | TCIA 0.05 parts | TPMI 10 parts | 3 100 parts | TPMI 10 parts | O |
| 71 | (Chlorination degree = 30%) 100 parts | TCIA 0.05 parts | MDI 10 parts | 3 100 parts | TDI 10 parts | O |
| 72 | (Chlorination degree = 30%) 100 parts | TCIA 0.05 parts | / | 3 100 parts | TDI 10 parts | O |

Then, a polypropylene resin was injection molded at 200° C. by using the polyamide resin plate as an insert to manufacture laminates. In this case, vulcanizing reaction for the unvulcanized rubber in the adhesives for polyolefin polymer proceeded simultaneously.

After manufacturing the respective laminates comprising the polyamide resin, adhesive layer and polypropylene resin described above, they were left for 7 days at a room temperature and further left for one hour in a thermostable bath at 80° C. Then, it was measured as to whether delamination was resulted between the polyamide resin and the polypropylene resin at the bent portion for each of the laminates respectively in the same manner as in Example-1. The results are shown in Tables 8 and 9 together with the combination of the adhesives for polyolefin polymer and the adhesives for polar polymer employed. Any of the laminates showed favorable close bondability excepting for the case of laminates 41–44, 51, 54, 57, 58, 61 and 63 in which the combination of the adhesives were inadequate.

Delamination was resulted in the adhesive layer of the laminate 41 since it was composed only of chlorinated polypropylene, in the adhesive layers of laminates 42, 44 and 58 due to the lack of the adhesives for polyolefin polymer and in the adhesive layer of laminates 43 and 57 due to the lack of the adhesives for polar polymer.

Further, the blending ratio of the halogenating agent in the adhesives for polyolefin polymer was lower in the adhesive layer of laminate 61, the blending ratio of the halogenating agent in the adhesives for polyolefin polymer was excessive in the adhesive layer of laminate 63.

Further, the blending ratio of the polyisocyanate in the adhesives for polyolefin polymer was lower in the adhesive layer of laminate 51 and the blending ratio of the polyisocyanate in the adhesives for use in polar polymer was excessive in the adhesive layer of laminate 54.

Accordingly, any of the laminates described above showed delamination or weak close bondability.

As has been described above according to this invention, since an adhesive layer comprising adhesives for polyolefin polymer and adhesives for polar polymer is coated to form on the joined faces of polyolefin polymer and polar polymer in a molding product comprising both of the polymers in lamination, it is possible to obtain laminates in which the joined faces are firmly bonded for a long period of time.

This invention is no way limited only to the foregoing examples but it is of course possible to embody the invention, for example, as described below.

(1) The adhesive layer for joining the polyolefin polymer and the polar polymer is composed only of a mixture of chlorinated polyolefin (particularly chlorinated polypropylene) and polyurethane, or a mixture of chlorinated polyolefin (particularly chlorinated polypropylene), polyurethane and halogenating agent. For example, an adhesive layer is formed with a mxiture of from 1 to 250 parts by weight of polyester polyurethane having NCO group or OH group in the terminal end of the molecule based on 100 parts by weight of chlorinated polypropylene at 5–60% of chlorination degree.

Alternatively, the adhesive layer may be composed of a mixture of from 1 to 250 parts by weight of polyester polyurethane having NCO group or OH group in the terminal end of the molecule and from 0.002 to 40 parts by weight of halogenating agent consisting at least one of the compound containing

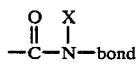

(where X represents halogen) in the molecule, alkyl hypohalide and hypohalogenate based on 100 parts by weight of the chlorinated polypropylene at 5-60% of chlorination degree.

Further, the mixture of the chlorinated polyolefin and polyurethane as exemplified above shows sufficient close bondability when used for the bonding between polyolefin vulcanized rubbers or polyolefin synthetic resins. In this case, chlorinated polyethylene may be used as the chlorinated polyolefin and polyether polyurethane may be used as the polyurethane in addition to those as described above.

(2) The adhesive layer for bonding the polyolefin polymer and the polar polymer may be composed only of a mixture of rubber, polyurethane and polyisocyanate or a mixture composed of rubber, polyurethane and halogenating agent. For instance, the adhesive layer may be formed by a mixture composed of from 4 to 300 parts by weight of polyester polyurethane containing NCO group or OH group in the terminal end of the molecule and from 0.1 to 50 parts by weight of polyisocyanate based on 100 parts by weight of rubber. Alternatively, the adhesive layer may be formed by a mixture comprising from 4 to 300 parts by weight of polyester polyurethane containing NCO group or OH group in the terminal end of the molecule and from 0.002 to 20 parts by weight of halogenating agent consisting at least one of a compound containing

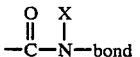

(where X represents halogen) in the molecule, alkyl hypohalide and hypohalogenate based on 100 parts by weight of rubber.

Since it will be apparent that various different embodiments may generally be constituted without departing the spirit and the scope of the invention, this invention is no way limited to the specific embodiments thereof unless restricted in the appended claims.

What is claimed is:

1. A laminate comprising:
(A) a polyolefin polymer,
(B) a polar polymer and
(C) an adhesive disposed between both of said polymers for bonding them, in which said adhesive is composed of (a) an adhesive consisting essentially of a mixture of chlorinated polyolefin at 5-60% of chlorination degree and at least one of polyisocyanate and halogen compound coated on the side of said polyolefin polymer and (b) an adhesive composed of polyurethane or a mixture of polyurethane and polyisocyanate coated on the side of the polar polymer.

2. A laminate as defined in claim 1, wherein the adhesive on the side of the polyolefin polymer is a mixture of from 0.1 to 50 parts by weight of polyisocyanate based on 100 parts by weight of chlorinated polyolefin at 5-60% of chlorination degree.

3. A laminate as defined in claim 1, wherein the adhesive on the side of the polyolefin polymer is a mixture of from 0.002 to 40 parts by weight of said halogen compound based on 100 parts by weight of chlorinated polyolefin at 5-60% of chlorination degree.

4. A laminate as defined in claim 1, wherein the adhesive on the side of the polyolefin polymer is a mixture of from 0.1 to 50 parts by weight of polyisocyanate and from 0.002 to 40 parts by weight of said halogen compound based on 100 parts by weight of chlorinated polyolefin at 5-60% of chlorination degree.

5. A laminate as defined in claim 1, wherein the adhesive on the side of the polar polymer is a mixture of less than 50 parts by weight of polyisocyanate based on 100 parts by weight of polyurethane.

6. A laminate as defined in claim 1, wherein the adhesive on the side of the polar polymer is polyester polyurethane containing NCO group or OH group in the terminal end of the molecule.

7. A laminate as defined in claim 1, wherein the said halogen compound is at least one of members selected from the group consisting of a compound containing

(where X represents halogen) in the molecule, alkyl hypohalide and hypohalogenate.

8. A laminate as defined in claim 7, wherein the alkyl hypohalide is tertiary alkyl hypochloride or tertiary alkyl hypobromide.

9. A laminate as defined in claim 1, wherein the chlorinated polyolefin is chlorinated polyethylene or chlorinated polypropylene.

10. A laminate comprising:
(a) a polyolefin polymer,
(b) a polar polymer and
(c) an adhesive disposed between both of said polymers for bonding them, in which said adhesive is composed of (a) an adhesive consisting essentially of a mixture of chlorinated polyolefin at 5-60% of chlorination degree and at least one of polyisocyanate and halogen compound coated on the side of said polyolefin polymer and (b) an adhesive compound of polyurethane or a mixture of polyurethane and polyisocyanate coated on the side of the polar polymer said mixture of chlorinated polyolefin at 5-60% of chlorination degree and at least one of polyisocyanate and said halogen compound is further blended with a polymer obtained by the polymerization of a low molecular weight polyol and diisocyanate or polyfunctional isocyanate at a ratio of less than 50 parts by weight based on 100 parts by weight of the chlorinated polyolefin.

* * * * *